(12) United States Patent
Xu et al.

(10) Patent No.: US 10,222,646 B2
(45) Date of Patent: Mar. 5, 2019

(54) DISPLAY, SUBSTRATE AND MANUFACTURING METHOD THEREOF, DRIVING METHOD OF DISPLAY SUBSTRATE AND DISPLAY DEVICE

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Yubo Xu, Beijing (CN); Ming Hu, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 461 days.

(21) Appl. No.: 14/429,431

(22) PCT Filed: Jul. 25, 2014

(86) PCT No.: PCT/CN2014/083037
§ 371 (c)(1),
(2) Date: Mar. 19, 2015

(87) PCT Pub. No.: WO2015/113386
PCT Pub. Date: Aug. 6, 2015

(65) Prior Publication Data
US 2016/0026038 A1    Jan. 28, 2016

(30) Foreign Application Priority Data

Jan. 29, 2014 (CN) .......................... 2014 1 0043941

(51) Int. Cl.
*G02F 1/1335* (2006.01)
*G02B 5/20* (2006.01)
(Continued)

(52) U.S. Cl.
CPC ....... *G02F 1/133514* (2013.01); *G02B 5/201* (2013.01); *G02F 1/133516* (2013.01);
(Continued)

(58) Field of Classification Search
CPC ....... G09G 2320/0276; G09G 2360/16; G09G 2320/0626; G02F 1/133514
See application file for complete search history.

(56) References Cited

U.S. PATENT DOCUMENTS

| 7,505,053 B2 * | 3/2009 | Brown Elliott ... G02F 1/133514 345/694 |
| 7,564,530 B2 * | 7/2009 | Hu .................... G02F 1/133514 349/109 |

(Continued)

FOREIGN PATENT DOCUMENTS

| CN | 101409065 A | 4/2009 |
| CN | 102243828 A | 11/2011 |

(Continued)

OTHER PUBLICATIONS

First Office Action dated Oct. 30, 2015 corresponding to Chinese application No. 201410043941.3.
(Continued)

*Primary Examiner* — Alexander Eisen
*Assistant Examiner* — Mansour Said
(74) *Attorney, Agent, or Firm* — Nath, Goldberg & Meyer; Joshua B. Goldberg

(57) ABSTRACT

The present invention provides a display substrate and a manufacturing method thereof, and a driving method of a display substrate. In the display substrate, a plurality of pixel
(Continued)

groups are repeatedly arranged on a substrate base, each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, the first subpixel, the second subpixel, the third subpixel and the fourth subpixel in different rows of subpixels in each of the pixel groups are arranged successively in different orders, and subpixels with the same color are not located in the same column so that the subpixels are distributed uniformly.

8 Claims, 5 Drawing Sheets

(51) Int. Cl.
G02F 1/1343 (2006.01)
G09G 3/20 (2006.01)

(52) U.S. Cl.
CPC ..... *G02F 1/134336* (2013.01); *G09G 3/2003* (2013.01); *G02F 2001/134345* (2013.01); *G02F 2201/52* (2013.01); *G09G 2300/0452* (2013.01)

(56) References Cited

U.S. PATENT DOCUMENTS

| 8,717,255 | B2* | 5/2014 | Phan | G09G 3/2003 |
| | | | | 345/55 |
| 9,165,526 | B2* | 10/2015 | Gu | G09G 5/02 |
| 9,343,008 | B2* | 5/2016 | Madhusudan | G09G 3/3208 |
| 2008/0231577 | A1* | 9/2008 | Lin | G09G 3/3607 |
| | | | | 345/90 |
| 2013/0207948 | A1* | 8/2013 | Na | G09G 3/003 |
| | | | | 345/207 |
| 2016/0232859 | A1* | 8/2016 | Oh | G09G 3/3611 |
| 2016/0343313 | A1* | 11/2016 | Ji | G09G 3/36 |

FOREIGN PATENT DOCUMENTS

| CN | 103792723 A | | 5/2014 | |
| CN | 103792724 A | | 5/2014 | |
| CN | 103792725 A | | 5/2014 | |
| KR | 1020050095150 A | | 9/2005 | |
| KR | 1020050095150 | * | 9/2011 | ............. G02F 1/335 |

OTHER PUBLICATIONS

Written Opinion of the International Searching Authority dated Oct. 27, 2014 corresponding to International application No. PCT/CN2014/083037.

Search Report issued in International Application No. PCT/CN2014/083037, fourteen (14) pages.

* cited by examiner

DISPLAY, SUBSTRATE AND MANUFACTURING METHOD THEREOF, DRIVING METHOD OF DISPLAY SUBSTRATE AND DISPLAY DEVICE

This is a National Phase Application filed under 35 U.S.C. 371 as a national stage of PCT/CN2014/083037, filed Jul. 25, 2014, and claims priority benefit from Chinese Application No. 201410043941.3, filed Jan. 29, 2014, the content of each of which is hereby incorporated by reference in its entirety.

FIELD OF THE INVENTION

The present invention relates to the technical field of display, and particularly relates to a display substrate and a manufacturing method thereof, a driving method of the display substrate and a display device.

BACKGROUND OF THE INVENTION

Currently, liquid crystal display is the most commonly used panel display, wherein thin film transistor liquid crystal display (TFT-LCD) is the mainstream product of the liquid crystal display. Display device is an important member of the liquid crystal display. The display device is formed by aligning an array substrate and a color filter substrate to form a cell and filling a layer of liquid crystal between the array substrate and the color filter substrate.

FIG. 1 shows a structural diagram of a color filter substrate in the prior art. As shown in FIG. 1, the color filter substrate comprises: a black matrix 10, and a red subpixel 11, a green subpixel 12, a blue subpixel 13 and a white subpixel 14 arranged successively. The color subpixels used in the color filter substrate of FIG. 1 are in a traditional arrangement of four primary colors (i.e., red, green, blue, and white), so as to perform picture display of the display device.

However, in the prior art, distribution of white subpixels 14 is too concentrated. When there are white subpixels 14 located in the same column, obvious white stripes may be appeared in the gray-scale picture displayed by the display device, thus display quality of the display picture is reduced.

SUMMARY OF THE INVENTION

An object of the present invention is to provide a display substrate and a manufacturing method thereof, a driving method of the display substrate and a display device for improving display quality of the display picture.

In order to achieve the object described above, the present invention provides a display substrate comprising a substrate base and a plurality of pixel groups repeatedly arranged on the substrate base, each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, and in one of the pixel groups, the first subpixel, the second subpixel, the third subpixel and the fourth subpixel in one row of subpixels are arranged successively, the second subpixel, the third subpixel, the fourth subpixel and the first subpixel in one row of subpixels are arranged successively, the fourth subpixel, the first subpixel, the second subpixel and the third subpixel in one row of subpixels are arranged successively, and the third subpixel, the fourth subpixel, the first subpixel and the second subpixel in one row of subpixels are arranged successively.

Optionally, in one of the pixel groups, the first subpixel, the second subpixel, the third subpixel and the fourth subpixel in a first row of subpixels are arranged successively, the second subpixel, the third subpixel, the fourth subpixel and the first subpixel in a second row of subpixels are arranged successively, the fourth subpixel, the first subpixel, the second subpixel and the third subpixel in a third row of subpixels are arranged successively, and the third subpixel, the fourth subpixel, the first subpixel and the second subpixel in a fourth row of subpixels are arranged successively.

Optionally, the first subpixel is a red subpixel, the second pixel is a green subpixel, the third subpixel is a blue subpixel, and the fourth subpixel is a white subpixel.

Optionally, in each row of subpixels, four or two subpixels of the first subpixel, the second subpixel, the third subpixel and the fourth subpixel constitute one pixel unit.

In order to achieve the object described above, the present invention provides a display device comprising a display substrate and an opposite substrate for aligning with the display substrate to form a cell, the display substrate is any one of the display substrates described above.

Optionally, the display substrate is a color filter substrate, and the opposite substrate for aligning with the display substrate to form a cell is an array substrate.

In order to achieve the object described above, the present invention provides a manufacturing method of a display substrate, comprising steps of: forming a plurality of pixel groups repeatedly arranged on a substrate base, each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, and in one of the pixel groups, the first subpixel, the second subpixel, the third subpixel and the fourth subpixel in one row of subpixels are arranged successively, the second subpixel, the third subpixel, the fourth subpixel and the first subpixel in one row of subpixels are arranged successively, the fourth subpixel, the first subpixel, the second subpixel and the third subpixel in one row of subpixels are arranged successively, and the third subpixel, the fourth subpixel, the first subpixel and the second subpixel in one row of subpixels are arranged successively.

Optionally, in one of the pixel groups, the first subpixel, the second subpixel, the third subpixel and the fourth subpixel in a first row of subpixels are arranged successively, the second subpixel, the third subpixel, the fourth subpixel and the first subpixel in a second row of subpixels are arranged successively, the fourth subpixel, the first subpixel, the second subpixel and the third subpixel in a third row of subpixels are arranged successively, and the third subpixel, the fourth subpixel, the first subpixel and the second subpixel in a fourth row of subpixels are arranged successively.

Optionally, the first subpixel is a red subpixel, the second pixel is a green subpixel, the third subpixel is a blue subpixel, and the fourth subpixel is a white subpixel.

Optionally, in each row of subpixels, four or two subpixels of the first subpixel, the second subpixel, the third subpixel and the fourth subpixel constitute one pixel unit.

In order to achieve the object described above, the present invention provides a driving method of a display substrate, the display substrate comprises a substrate base and a plurality of pixel groups repeatedly arranged on the substrate base, each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, and in one of the pixel groups, the first subpixel, the second subpixel, the third subpixel and the fourth subpixel in one row of subpixels are arranged successively, the second subpixel, the third subpixel, the fourth subpixel and the first subpixel in one row of subpixels are arranged successively, the fourth subpixel, the first subpixel, the second subpixel and the third subpixel in one row of subpixels are arranged successively, and the third subpixel, the fourth subpixel, the first subpixel and the second subpixel in one row of subpixels are arranged successively, the driving method comprises steps of: loading a data signal for each subpixel in each row of subpixels in each of the pixel groups successively, wherein a first data signal is loaded for the first subpixel, a second data signal is loaded for the second subpixel, a third data signal is loaded for the third subpixel, a fourth data signal is loaded for the fourth subpixel.

Optionally, in one of the pixel groups of the display substrate, the first subpixel, the second subpixel, the third subpixel and the fourth subpixel in a first row of subpixels are arranged successively, the second subpixel, the third subpixel, the fourth subpixel and the first subpixel in a second row of subpixels are arranged successively, the fourth subpixel, the first subpixel, the second subpixel and the third subpixel in a third row of subpixels are arranged successively, and the third subpixel, the fourth subpixel, the first subpixel and the second subpixel in a fourth row of subpixels are arranged successively, the driving method comprises: loading the first data signal for the first subpixel in the first row of subpixels, loading the second data signal for the second subpixel in the first row of subpixels, loading the third data signal for the third subpixel in the first row of subpixels, loading the fourth data signal for the fourth subpixel in the first row of subpixels; loading the second data signal for the second subpixel in the second row of subpixels, loading the third data signal for the third subpixel in the second row of subpixels, loading the fourth data signal for the fourth subpixel in the second row of subpixels, loading the first data signal for the first subpixel in the second row of subpixels; loading the fourth data signal for the fourth subpixel in the third row of subpixels, loading the first data signal for the first subpixel in the third row of subpixels, loading the second data signal for the second subpixel in the third row of subpixels, loading the third data signal for the third subpixel in the third row of subpixels; loading the third data signal for the third subpixel in the fourth row of subpixels, loading the fourth data signal for the fourth subpixel in the fourth row of subpixels, loading the first data signal for the first subpixel in the fourth row of subpixels, loading the second data signal for the second subpixel in the fourth row of subpixels.

Optionally, in each row of subpixels, four or two subpixels of the first subpixel, the second subpixel, the third subpixel and the fourth subpixel constitute one pixel unit, and the first data signal, the second data signal, the third data signal and the fourth data signal are determined in accordance with corresponding pixel units as targets for which the first data signal, the second data signal, the third data signal and the fourth data signal are loaded.

In technical solutions of the display substrate and the manufacturing method thereof, the driving method of the display substrate and the display device provided by the present invention, a plurality of pixel groups are repeatedly arranged on a substrate base, each of the pixel groups comprises four first subpixels, four second subpixels, four third subpixels and four fourth subpixels, the subpixels in each of the pixel groups are arranged in a 4×4 matrix, the first subpixel, the second subpixel, the third subpixel and the fourth subpixel in different rows of subpixels in each of the pixel groups are arranged successively in different orders, and subpixels with the same color are not located in the same column so that the subpixels are distributed uniformly, thus obvious white stripes may be avoided in the gray-scale picture displayed by the display device, and display quality of the display picture is improved.

DETAILED DESCRIPTION OF THE EMBODIMENTS

In order to make the persons skilled in the art understand the technical solutions of the present invention better, the display substrate and the manufacturing method thereof, the driving method of the display substrate and the display device provided by the present invention will be described in detail below in conjunction with the accompanying drawings.

Figure 1:
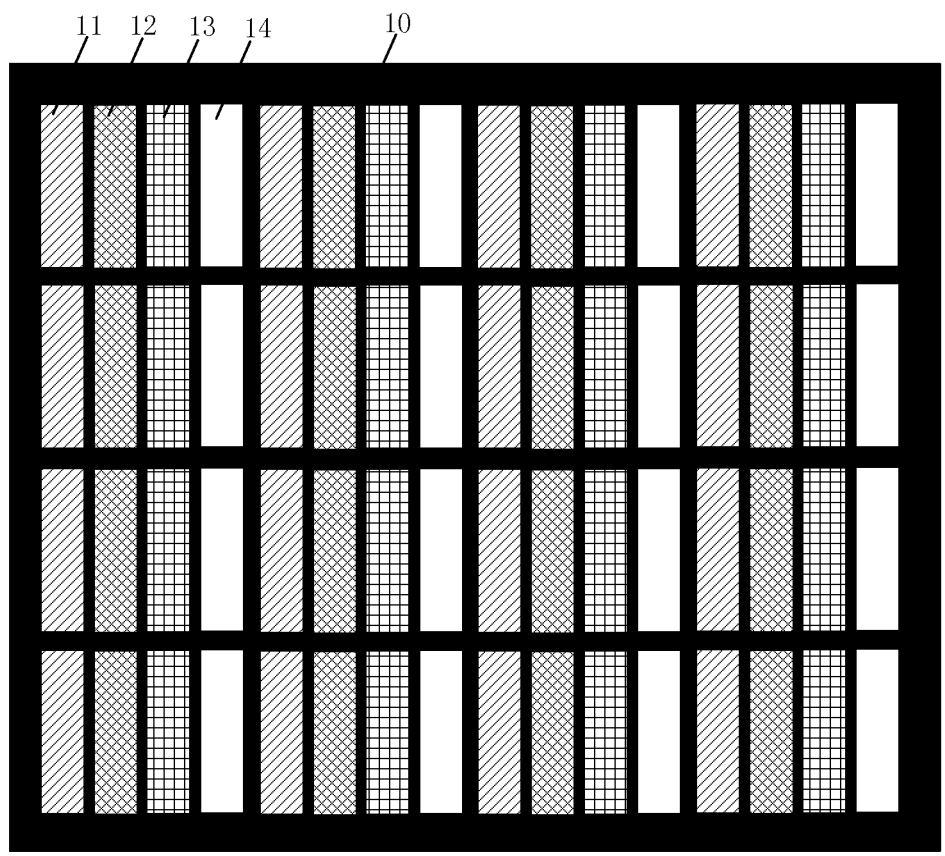
FIG. 1 is a structural diagram of a color filter substrate in the prior art.
Figure 2:
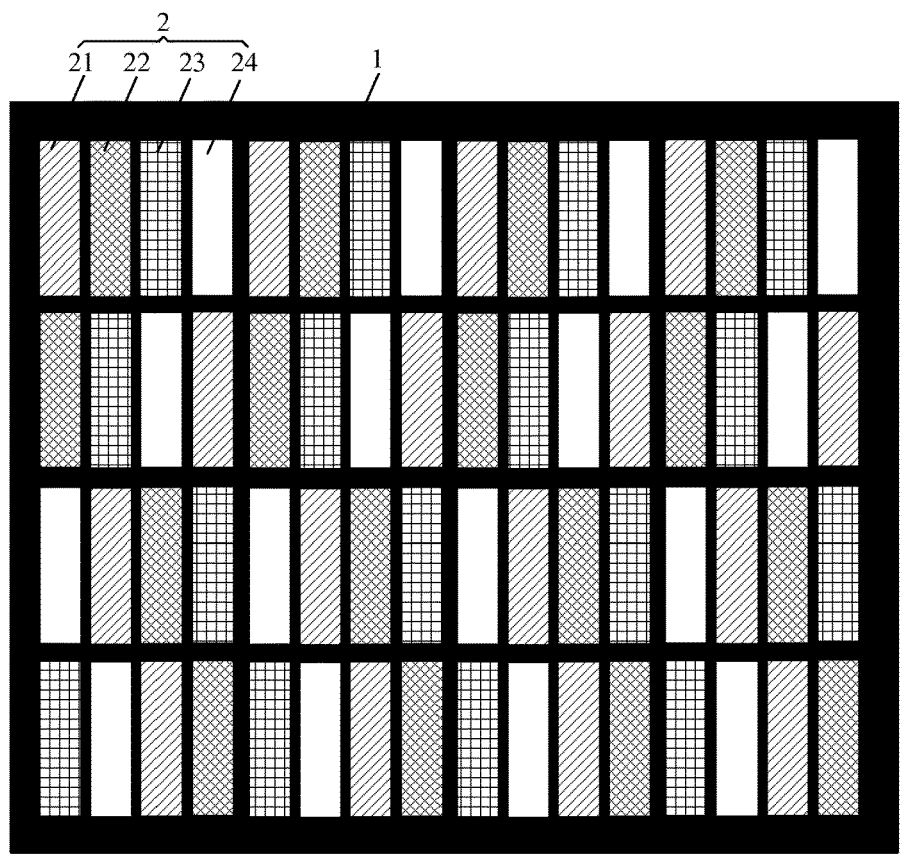
FIG. 2 is a structural diagram of a display substrate in accordance with a first embodiment of the present invention.

FIG. 2 is a structural diagram of a display substrate in accordance with a first embodiment of the present invention. As shown in FIG. 2, the display substrate comprises: a substrate base and a plurality of pixel groups repeatedly arranged on the substrate base, taking four pixel groups as an example in FIG. 2, each of the pixel groups comprises four first subpixels 21, four second subpixels 22, four third subpixels 23 and four fourth subpixels 24, the subpixels in each of the pixel groups are arranged in a 4×4 matrix, each row of subpixels in each of the pixel groups include one first subpixel 21, one second subpixel 22, one third subpixel 23 and one fourth subpixel 24. In one of the pixel groups, the first subpixel 21, the second subpixel 22, the third subpixel 23 and the fourth subpixel 24 in the first row of subpixels are arranged successively, the second subpixel 22, the third subpixel 23, the fourth subpixel 24 and the first subpixel 21 in the second row of subpixels are arranged successively, the fourth subpixel 24, the first subpixel 21, the second subpixel 22 and the third subpixel 23 in the third row of subpixels are arranged successively, and the third subpixel 23, the fourth subpixel 24, the first subpixel 21 and the second subpixel 22 in the fourth row of subpixels are arranged successively.

Specifically, the first subpixel 21 is a red subpixel, the second subpixel 22 is a green subpixel, the third subpixel 23 is a blue subpixel, and the fourth subpixel 24 is a white subpixel. In one of the pixel groups, the red subpixel, the green subpixel, the blue subpixel and the white subpixel in the first row of subpixels are arranged successively, the green subpixel, the blue subpixel, the white subpixel and the red subpixel in the second row of subpixels are arranged successively, the white subpixel, the red subpixel, the green subpixel and the blue subpixel in the third row of subpixels are arranged successively, and the blue subpixel, the white subpixel, the red subpixel and the green subpixel in the fourth row of subpixels are arranged successively.

In each row of subpixels, four subpixels of the first subpixel 21, the second subpixel 22, the third subpixel 23 and the fourth subpixel 24 constitute one pixel unit. If the first subpixel 21 is a red subpixel, the second subpixel 22 is a green subpixel, the third subpixel 23 is a blue subpixel and the fourth subpixel 24 is a white subpixel, the pixel unit 2 in the first row of subpixels comprises the red subpixel, the green subpixel, the blue subpixel and the white subpixel arranged successively, the pixel unit 2 in the second row of subpixels comprises the green subpixel, the blue subpixel, the white subpixel and the red subpixel arranged successively, the pixel unit 2 in the third row of subpixels comprises the white subpixel, the red subpixel, the green subpixel and the blue subpixel arranged successively, and the pixel unit 2 in the fourth row of subpixels comprises the blue subpixel, the white subpixel, the red subpixel and the green subpixel arranged successively.

Optionally, the display substrate may further comprise a black matrix 1 formed on the substrate base for separating the subpixels.

In the technical solutions of the display substrate in the present embodiment, a plurality of pixel groups are repeatedly arranged on a substrate base, each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, the first subpixel, the second subpixel, the third subpixel and the fourth subpixel in different rows of subpixels in each of the pixel groups are arranged successively in different orders, and subpixels with the same color are not located in the same column so that the subpixels are distributed uniformly, thus obvious white stripes may be avoided in the gray-scale picture displayed by the display device, and display quality of the display picture is improved.

Figure 3:
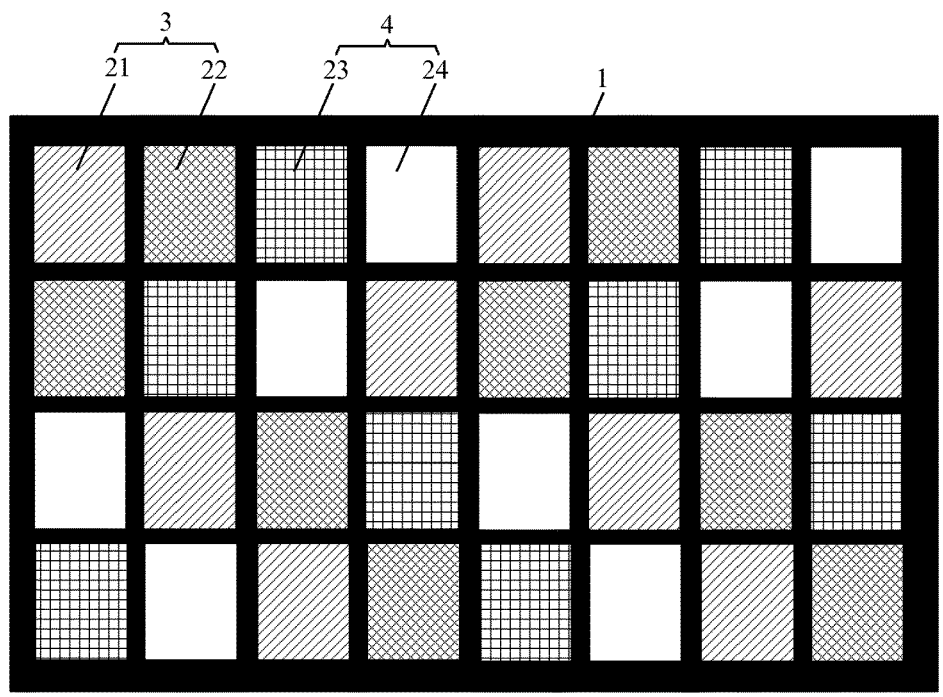
FIG. 3 is a structural diagram of a display substrate in accordance with a second embodiment of the present invention.

FIG. 3 is a structural diagram of a display substrate in accordance with a second embodiment of the present invention. As shown in FIG. 3, the display substrate comprises: a substrate base and a plurality of pixel groups repeatedly arranged on the substrate base, taking two pixel groups as an example in FIG. 3, each of the pixel groups comprises four first subpixels 21, four second subpixels 22, four third subpixels 23 and four fourth subpixels 24, the subpixels in each of the pixel groups are arranged in a 4×4 matrix, each row of subpixels in each of the pixel groups include one first subpixel 21, one second subpixel 22, one third subpixel 23 and one fourth subpixel 24. In one of the pixel groups, the first subpixel 21, the second subpixel 22, the third subpixel 23 and the fourth subpixel 24 in the first row of subpixels are arranged successively, the second subpixel 22, the third subpixel 23, the fourth subpixel 24 and the first subpixel 21 in the second row of subpixels are arranged successively, the fourth subpixel 24, the first subpixel 21, the second subpixel 22 and the third subpixel 23 in the third row of subpixels are arranged successively, and the third subpixel 23, the fourth subpixel 24, the first subpixel 21 and the second subpixel 22 in the fourth row of subpixels are arranged successively.

Specifically, the first subpixel 21 is a red subpixel, the second subpixel 22 is a green subpixel, the third subpixel 23 is a blue subpixel, and the fourth subpixel 24 is a white subpixel. In one of the pixel groups, the red subpixel, the green subpixel, the blue subpixel and the white subpixel in the first row of subpixels are arranged successively, the green subpixel, the blue subpixel, the white subpixel and the red subpixel in the second row of subpixels are arranged successively, the white subpixel, the red subpixel, the green subpixel and the blue subpixel in the third row of subpixels are arranged successively, and the blue subpixel, the white subpixel, the red subpixel and the green subpixel in the fourth row of subpixels are arranged successively.

In each row of subpixels, two subpixels of the first subpixel 21, the second subpixel 22, the third subpixel 23 and the fourth subpixel 24 constitute one pixel unit. If the first subpixel 21 is a red subpixel, the second subpixel 22 is a green subpixel, the third subpixel 23 is a blue subpixel and the fourth subpixel 24 is a white subpixel, the pixel unit 3 in the first row of subpixels comprises the red subpixel and the green subpixel arranged successively, the pixel unit 4 in the first row of subpixels comprises the blue subpixel and the white subpixel arranged successively, the pixel unit 3 in the second row of subpixels comprises the green subpixel and the blue subpixel arranged successively, the pixel unit 4 in the second row of subpixels comprises the white subpixel and the red subpixel arranged successively, the pixel unit 3 in the third row of subpixels comprises the white subpixel and the red subpixel arranged successively, the pixel unit 4 in the third row of subpixels comprises the green subpixel and the blue subpixel arranged successively, the pixel unit 3 in the fourth row of subpixels comprises the blue subpixel and the white subpixel arranged successively, and the pixel unit 4 in the fourth row of subpixels comprises the red subpixel and the green subpixel arranged successively.

Compared to the display substrate in the first embodiment, the width of a single subpixel in the present embodiment is two times of the width of a single subpixel in the first embodiment, thus the number of columns of the subpixels is reduced, so that the number of data lines is reduced, the number of driving chips is reduced, and the cost of the product is reduced.

In the technical solutions of the display substrate in the present embodiment, a plurality of pixel groups are repeatedly arranged on a substrate base, each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, the first subpixel, the second subpixel, the third subpixel and the fourth subpixel in different rows of subpixels in each of the pixel groups are arranged successively in different orders, and subpixels with the same color are not located in the same column so that the subpixels are distributed uniformly, thus obvious white stripes may be avoided in the gray-scale picture displayed by the display device, and display quality of the display picture is improved.

The third embodiment of the present invention provides a display device comprising a display substrate and an opposite substrate for aligning with the display substrate to form a cell, a layer of liquid crystal is provided between the display substrate and the opposite substrate, wherein the display substrate is the display substrate described in the first or second embodiment.

For example, the display substrate is a color filter substrate, and the opposite substrate for aligning with the display substrate to form a cell is an array substrate.

In addition, the display substrate also may be a color filter on array (COA) substrate, and the opposite substrate for aligning with the display substrate to form a cell is a glass substrate.

Optionally, on the COA substrate, a black matrix, red subpixel unit, a green subpixel unit, a blue subpixel unit and a white subpixel unit are formed on the front side of the substrate base, and the structures of the original array substrate are formed on the back side of the substrate base. That is, the COA substrate is formed by providing the original color filter substrate and the original array substrate on the front side and the back side of a substrate base respectively.

In the technical solutions of the display substrate in the present embodiment, a plurality of pixel groups are repeatedly arranged on a substrate base, each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, the first subpixel, the second subpixel, the third subpixel and the fourth subpixel in different rows of subpixels in each of the pixel groups are arranged successively in different orders, and subpixels with the same color are not located in the same column so that the subpixels are distributed uniformly, thus obvious white stripes may be avoided in the gray-scale picture displayed by the display device, and display quality of the display picture is improved.

Figure 4:
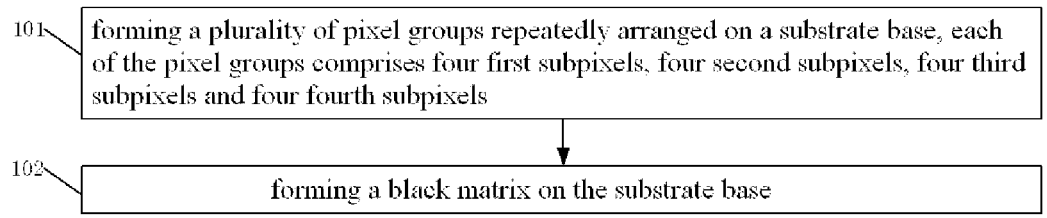
FIG. 4 is a flowchart of a manufacturing method of a display substrate in accordance with a fourth embodiment of the present invention.
Figure 5:
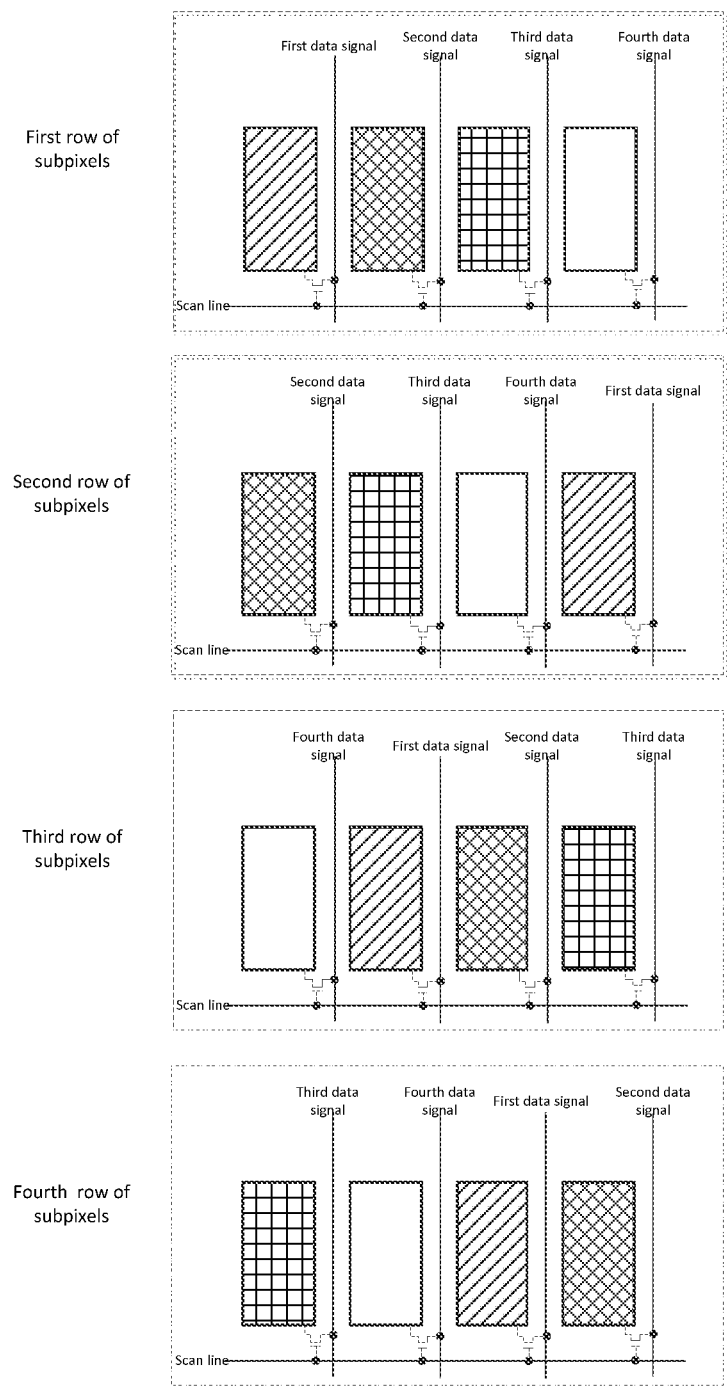
FIG. 5 shows a diagram of driving the display substrate in accordance with the first embodiment or the second embodiment of the present invention.
Figure 6:
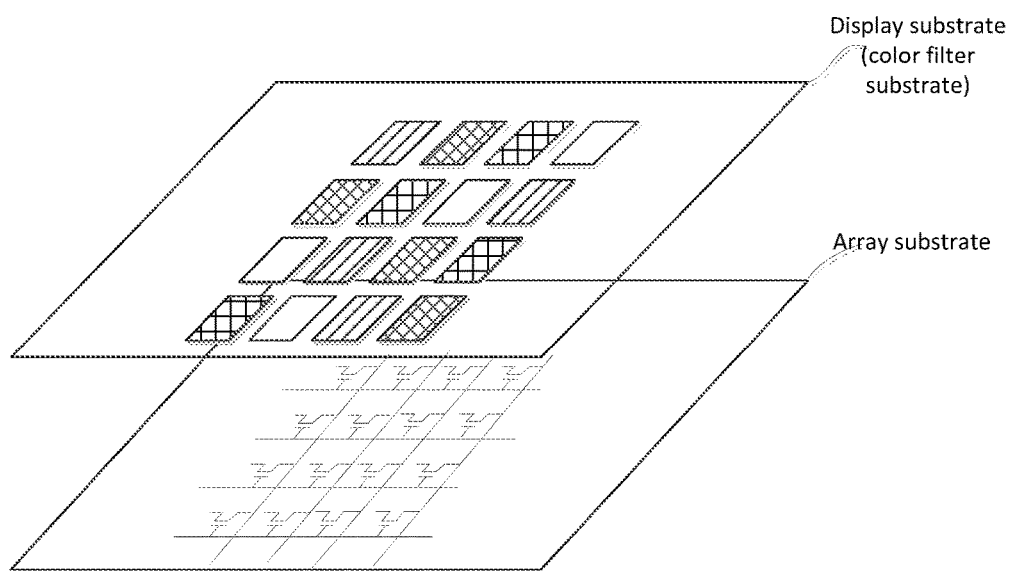
FIG. 6 shows a diagram of a display device in accordance with the third embodiment of the present invention.

FIG. 4 is a flowchart of a manufacturing method of a display substrate in accordance with a fourth embodiment of the present invention. As shown in FIG. 4, the manufacturing method comprises steps 101 and 102.

Step 101, forming a plurality of pixel groups repeatedly arranged on a substrate base, each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, in one of the pixel groups, the first subpixel, the second subpixel, the third subpixel and the fourth subpixel in the first row of subpixels are arranged successively, the second subpixel, the third subpixel, the fourth subpixel and the first subpixel in the second row of subpixels are arranged successively, the fourth subpixel, the first subpixel, the second subpixel and the third subpixel in the third row of subpixels are arranged successively, and the third subpixel, the fourth subpixel, the first subpixel and the second subpixel in the fourth row of subpixels are arranged successively.

Specifically, the step 101 may comprise sub-steps 1011 through 1014.

Sub-step 1011, forming the first subpixels on the substrate base by a patterning process.

Sub-step 1012, forming the second subpixels on the substrate base by a patterning process.

Sub-step 1013, forming the third subpixels on the substrate base by a patterning process.

Sub-step 1014, forming the fourth subpixels on the substrate base by a patterning process.

In the present embodiment, the execution order of the sub-steps 1011 through 1014 may be changed if required.

In the present embodiment, the first subpixel is a red subpixel, the second subpixel is a green subpixel, the third subpixel is a blue subpixel, and the fourth subpixel is a white subpixel.

In the present embodiment, in each row of subpixels, four or two subpixels of the first subpixel, the second subpixel, the third subpixel and the fourth subpixel constitute one pixel unit.

Step 102, forming a black matrix on the substrate base to separate the subpixels.

Specifically, the black matrix may be formed on the substrate base by a patterning process.

In the present embodiment, the execution order of the steps of 101 and 102 may be changed if required.

In the present embodiment, the patterning process may include processes of photoresist applying, exposure, developing, etching, photoresist stripping and so on.

The manufacturing method of the display substrate in the present embodiment may be used for manufacturing the display substrate described in the first or second embodiment, and the detailed description of the display substrate may be referred to the first or second embodiment and will not be repeated herein.

In the display substrate manufactured by the manufacturing method of the display substrate in the present embodiment, a plurality of pixel groups are repeatedly arranged on a substrate base, each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, the first subpixel, the second subpixel, the third subpixel and the fourth subpixel in different rows of subpixels in each of the pixel groups are arranged successively in different orders, and subpixels with the same color are not located in the same column so that the subpixels are distributed uniformly, thus obvious white stripes may be avoided in the gray-scale picture displayed by the display device, and display quality of the display picture is improved.

The fifth embodiment of the present invention provides a driving method of a display substrate. The driving method is based on the display substrate described in the first or second embodiment, and the specific description may be referred to the first or second embodiment. The driving method comprises steps 201 through 204.

Step 201, loading a first data signal for the first subpixel in the first row of subpixels, loading a second data signal for the second subpixel in the first row of subpixels, loading a third data signal for the third subpixel in the first row of subpixels, loading a fourth data signal for the fourth subpixel in the first row of subpixels.

Step 202, loading the second data signal for the second subpixel in the second row of subpixels, loading the third data signal for the third subpixel in the second row of subpixels, loading the fourth data signal for the fourth subpixel in the second row of subpixels, loading the first data signal for the first subpixel in the second row of subpixels.

Step 203, loading the fourth data signal for the fourth subpixel in the third row of subpixels, loading the first data signal for the first subpixel in the third row of subpixels, loading the second data signal for the second subpixel in the third row of subpixels, loading the third data signal for the third subpixel in the third row of subpixels.

Step 204, loading the third data signal for the third subpixel in the fourth row of subpixels, loading the fourth data signal for the fourth subpixel in the fourth row of subpixels, loading the first data signal for the first subpixel in the fourth row of subpixels, loading the second data signal for the second subpixel in the fourth row of subpixels.

The steps 201 through 204 are executed repeatedly so that the driving procedure of the whole display substrate is completed.

In the present embodiment, different division methods of the pixel units correspond to different driving methods of the display substrate. In each row of subpixels, four or two subpixels of the first subpixel, the second subpixel, the third subpixel and the fourth subpixel constitute one pixel unit, and the first data signal, the second data signal, the third data signal and the fourth data signal are determined in accordance with corresponding pixel units as targets for which the first data signal, the second data signal, the third data signal and the fourth data signal are loaded.

In the display substrate driven by the driving method of the display substrate in the present embodiment, a plurality of pixel groups are repeatedly arranged on a substrate base, each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, the first subpixel, the second subpixel, the third subpixel and the fourth subpixel in different rows of subpixels in each of the pixel groups are arranged successively in different orders, and subpixels with the same color are not located in the same column so that the subpixels are distributed uniformly, thus obvious white stripes may be avoided in the gray-scale picture displayed by the display device, and display quality of the display picture is improved.

It could be understood that, the above implementations are merely exemplary embodiments adopted for describing the principle of the present invention, rather than limiting the present invention. Various variations and improvements may be made for those of ordinary skill in the art without departing from the spirit and essence of the present invention, and these variations and improvements are regarded within the protection scope of the present invention.

The invention claimed is:

1. A display substrate, comprising a substrate base and a plurality of pixel groups repeatedly arranged on the substrate base, wherein each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, and in one of the pixel groups, the first subpixel, the second subpixel, the third subpixel and the fourth subpixel in a first row of subpixels are arranged successively, the second subpixel, the third subpixel, the fourth subpixel and the first subpixel in a second row of subpixels are arranged successively, the fourth subpixel, the first subpixel, the second subpixel and the third subpixel in a third row of subpixels are arranged successively, and the third subpixel, the fourth subpixel, the first subpixel and the second subpixel in a fourth row of subpixels are arranged successively, wherein the first row of subpixels is directly adjacent to the second row of subpixels, the second row of subpixels is directly adjacent to the third row of subpixels, and the third row of subpixels is directly adjacent to the fourth row of subpixels.

2. The display substrate of claim 1, wherein the first subpixel is a red subpixel, the second pixel is a green subpixel, the third subpixel is a blue subpixel, and the fourth subpixel is a white subpixel.

3. The display substrate of claim 1, wherein four or two subpixels of the first subpixel, the second subpixel, the third subpixel and the fourth subpixel constitute one pixel unit in each row of subpixels.

4. A manufacturing method of a display substrate, comprising steps of:

forming a plurality of pixel groups repeatedly arranged on a substrate base, wherein each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, and in one of the pixel groups, the first subpixel, the second subpixel, the third subpixel and the fourth subpixel in a first row of subpixels are arranged successively, the second subpixel, the third subpixel, the fourth subpixel and the first subpixel in a second row of subpixels are arranged successively, the fourth subpixel, the first subpixel, the second subpixel and the third subpixel in a third row of subpixels are arranged successively, and the third subpixel, the fourth subpixel, the first subpixel and the second subpixel in a fourth row of subpixels are arranged successively, wherein the first row of subpixeis is directly adjacent to the second row of subpixels, the second row of subpixels is directly adjacent to the third row of subpixeis, and the third row of subpixels is directly adjacent to the fourth row of subpixeis.

5. The manufacturing method of claim 4, wherein the first subpixel is a red subpixel, the second pixel is a green subpixel, the third subpixel is a blue subpixel, and the fourth subpixel is a white subpixel.

6. The manufacturing method of claim 4, wherein four or two subpixels of the first subpixel, the second subpixel, the third subpixel and the fourth subpixel constitute one pixel unit in each row of subpixels.

7. A driving method of a display substrate, the display substrate comprising a substrate base and a plurality of pixel groups repeatedly arranged on the substrate base, wherein each of the pixel groups comprises four first subpixels, four second subpixels, four third subpixels and four fourth subpixels, the subpixels in each of the pixel groups are arranged in a 4×4 matrix, each row of subpixels in each of the pixel groups include one first subpixel, one second subpixel, one third subpixel and one fourth subpixel, and in one of the pixel groups, the first subpixel, the second subpixel, the third subpixel and the fourth subpixel in a first row of subpixels are arranged successively, the second subpixel, the third subpixel, the fourth subpixel and the first subpixel in a second row of subpixels are arranged successively, the fourth subpixel, the first subpixel, the second subpixel and the third subpixel in a third row of subpixels are arranged successively, and the third subpixel, the fourth subpixel, the first subpixel and the second subpixel in a fourth row of subpixels are arranged successively, the driving method comprises steps of:

loading a data signal for each subpixel in each row of subpixels in each of the pixel groups successively, wherein a first data signal is loaded for the first subpixel, a second data signal is loaded for the second subpixel, a third data signal is loaded for the third subpixel, a fourth data signal is loaded for the fourth subpixel, wherein the first row of subpixels is directly adjacent to the second row of subpixels, the second row of subpixels is directly adjacent to the third row of subpixels, and the third row of subpixels is directly adjacent to the fourth row of subpixels.

8. The driving method of claim 7, wherein four or two subpixels of the first subpixel, the second subpixel, the third subpixel and the fourth subpixel constitute one pixel unit in each row of subpixels, and the first data signal, the second data signal, the third data signal and the fourth data signal are determined in accordance with corresponding pixel units as targets for which the first data signal, the second data signal, the third data signal and the fourth data signal are loaded.

* * * * *